US006673481B1

(12) United States Patent
Reiser et al.

(10) Patent No.: US 6,673,481 B1
(45) Date of Patent: Jan. 6, 2004

(54) INITIATING OPERATION OF AN ELECTRIC VEHICLE OR OTHER LOAD POWERED BY A FUEL CELL AT SUB-FREEZING TEMPERATURE

(75) Inventors: Carl A. Reiser, Stonington, CT (US); Gennady Resnick, South Windsor, CT (US); Neil A. Popovich, Ellington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 10/390,439

(22) Filed: Mar. 17, 2003

Related U.S. Application Data (63) Continuation-in-part of application No. 10/187,547, filed on Jul. 1, 2002, now abandoned.
(51) Int. Cl.[7] .............................. H01M 8/04; H01M 8/10
(52) U.S. Cl. ............................ 429/13; 429/22; 429/23; 429/34
(58) Field of Search ............................ 429/13, 23, 34, 429/22

(56) References Cited

U.S. PATENT DOCUMENTS 5,798,186 A * 8/1998 Fletcher et al. ............... 429/13
6,479,177 B1 * 11/2002 Roberts et al. ............... 429/13
2003/0039872 A1 * 2/2003 Grasso et al. ............. 429/13 X

* cited by examiner

Primary Examiner—John S. Maples
(74) Attorney, Agent, or Firm—M. P. Williams (57) ABSTRACT

A vehicle (150) includes a fuel cell stack (151) started when the stack is below freezing, by connection (158) to the vehicle propulsion system (159) within a few seconds of starting the flow of fuel (179) and oxidant (173), or when open circuit voltage (155, 156) is detected. The fuel is in excess of stochiometry requirement and the oxidant is in excess of at least twice stochiometric requirement, either may be at about atmospheric pressure or at 4 kPa (0.6 psi) or more above the pressure of any water in said water passages, and either may be below freezing. Water transport plates (84, 86, 88, 89) have water passages connected to a water circulation loop (170) including a reservoir (164) having an auxiliary heater (161) connected (160) to the stack. Warming of cell stack materials and ice in the water transport plates, heat of fusion of melting ice, warming of melted water, and evaporative cooling of water melted in the water transport plates keep the fuel cell cool until liquid coolant can be circulated.

23 Claims, 6 Drawing Sheets

INITIATING OPERATION OF AN ELECTRIC VEHICLE OR OTHER LOAD POWERED BY A FUEL CELL AT SUB-FREEZING TEMPERATURE

CROSS REFERENCE TO RELATED APPLICATION

This is a continuation-in-part of U.S. patent application Ser. No. 10/187,547 filed on Jul. 1, 2002 abandoned.

TTECHNICAL FIELD

This invention relates to rapidly initiating operation of a fuel cell powered electric vehicle, at sub-freezing temperature, by means of one or more of: providing excess reactant gas or cold reactant gas to the proton exchange membrane (PEM) fuel cell stack which powers the load, such as a vehicle propulsion system, connecting the load to the stack within 20 seconds of reactant gas flow or when open circuit voltage is detected, previously draining hydrophilic support plates, connecting coolant only after several minutes or when sufficient water has melted.

BACKGROUND ART

It is generally agreed that one difficulty with utilizing fuel cells to power the propulsion system of electric vehicles is the requirement that such vehicles be operable at temperatures below that at which water will freeze. Freezing provides potential mechanical damage as a consequence of the expansion of ice, and presents problems due to the inseparability of water and the fuel cell processes. Heretofore, various methods of initiating operation of a fuel cell, preparatory to the operation of an electric vehicle, have concentrated on providing heat, either by reaction or combustion of fuel, or by means of battery power, to various water and other coolant conduits and reservoirs. Other efforts are directed toward processes designed to accelerate the rate at which a fuel cell stack will heat up to above-freezing temperatures, as a consequence of its own operation. In U.S. Pat. No. 5,798,186, the fuel cell is warmed up simply by connecting a load across it while stochiometric fuel and oxidant are supplied to the stack. In one experiment, with the fuel, oxidant and coolant water passages all having been purged of water upon previous shutdown of the stack, application of hydrogen and air at room temperature caused a temperature in the core of a ten cell stack to advance from $-11°$ C. to $0°$ C. in about one minute. A four cell stack, in which only the reactant channels (and not the coolant channel) were purged upon previous shut down, required five minutes, after circulation of hydrogen and oxygen began and a 50 amp load was connected, to increase from $-19°$ C. to $0°$ C. Coolant was not circulated until about 23 minutes after startup. In a four cell stack in which none of the channels were purged at the prior shut down, flow of warm hydrogen did not begin to occur until after four minutes, and 12 minutes expired between startup at $-23°$ C. and reaching $0°$ C. within the core of a four cell stack. In U.S. Pat. No. 6,329,089, individual fuel cells at $-5°$ C. started with room temperature hydrogen and air reached 0.5 amps per $cm^2$ in five minutes. With a short circuit load, a seven cell stack with a core temperature of $-15°$ C. reached 0.5 amps per $cm^2$ nine minutes after prolonged short circuiting of the stack output. Performance of other experiments were less satisfactory.

For use in vehicles, such as automobiles, an electric propulsion system must be operating in less than one minute, preferably less than one-half minute, after initiating startup. None of the foregoing are capable of providing fuel cells operable in subfreezing temperatures, particularly as low as $-40°$ C. ($-40°$ F.).

DISCLOSURE OF INVENTION

Objects of the invention include: operating, at subfreezing temperature, an electric vehicle powered by a fuel cell within seconds of initiation; improved initiation of fuel cell powered, electric vehicle operation at subfreezing temperature; initiating fuel cell powered electric vehicle operation at subfreezing temperature with a minimal of waste power used for raising the temperature of apparatus and/or fluids; avoiding the need for heat exchangers and other apparatus to heat reactants or coolants above freezing; and avoiding use of battery power to start a fuel cell for powering a vehicle.

This invention is predicated on the discovery that the propulsion system of an electric vehicle powered by a PEM fuel cell can be powered from the fuel cell while the fuel cell stack is frozen. This invention is further predicated on the discovery that contrary to belief of the prior art, excess reactants, rather than reactant starvation, will permit extended operation of the fuel cell stack pending the ability to flow water through the stack. The invention is further predicated on the discovery that high flow of cold reactant gases through the reactant flow fields is not sufficient to cause freezing of product water, the heat generated in the membrane electrode assembly being sufficient, and sufficiently close to the reactant flow fields, to prevent freezing of product water or refreezing of melted water.

The invention is also predicated on the discovery that fuel cell operation without loss of performance or damage to the cells can be extended during a frozen startup by providing at least one of the reactant gases at a pressure in excess of the pressure of any water in the stack, which before operation of a water circulation system is typically atmospheric.

According to the present invention, a PEM fuel cell stack at subfreezing temperature is connected to a vehicle propulsion system or other electric load within a few seconds or as soon as the stack provides open circuit voltage. According to the invention, the fuel cell stack is started with more than a stochiometric flow of fuel and at least stochiometric flow, but preferably two–five times stochiometric flow of oxidant, which may be at subfreezing temperatures, or not, whereby to prolong operation without localized heating, thereby permitting the vehicle (or other load) to be used during the time that the apparatus and fluids are being heated to suitable, operational temperatures. The invention not only permits, but prefers operation with reactants which are at the same sub-freezing ambient temperature as the fuel cell stack itself, contrary to usage of the prior art, since this prolongs the onset of localized overheating.

In further accord with the invention, in systems in which porous water transport plates are used for water management, heating of the water stored as ice in the pores of the water transport plates, by heating up the mass of the stack as well as the water, the heat of fusion as the ice melts, and evaporative cooling of some of that water, further prolongs the period of time at which the vehicle can be operated with power from the fuel cell stack, without circulating coolant, before there is impermissible local heating within the fuel cell.

In accordance further with the invention, at least one of the reactant gases is provided to the fuel cell stack at a pressure of at least about 4 kPa (0.6 psi) above the pressure of any water in the water channels, which typically will be about atmospheric pressure. This prevents liquid water from pooling in the reactant channels, and flooding the electrode substrates, which is particularly important in the oxidant gas reactant channel where product water can accumulate.

Principal aspects of the present invention include starting an electric load, such as a vehicle or other load, the fuel cell stack of which is at subfreezing temperatures, before awaiting for the fuel cell stack to reach normal operating temperature, by supplying the fuel cell with at least twice stochiometric quantities of oxidant, and using substantially empty hydrophilic support plates for temporary product water storage thereby to allow the fuel cell to operate without circulating coolant until such time as all of the water systems are functional.

Other objects, features and advantages of the present invention will become more apparent in the light of the following detailed description of exemplary embodiments thereof, as illustrated in the accompanying drawing.

MODE(S) FOR CARRYING OUT THE INVENTION

The invention may be used with a wide variety of fuel cell stacks, having fuel cells of various configurations.

Figure 1:
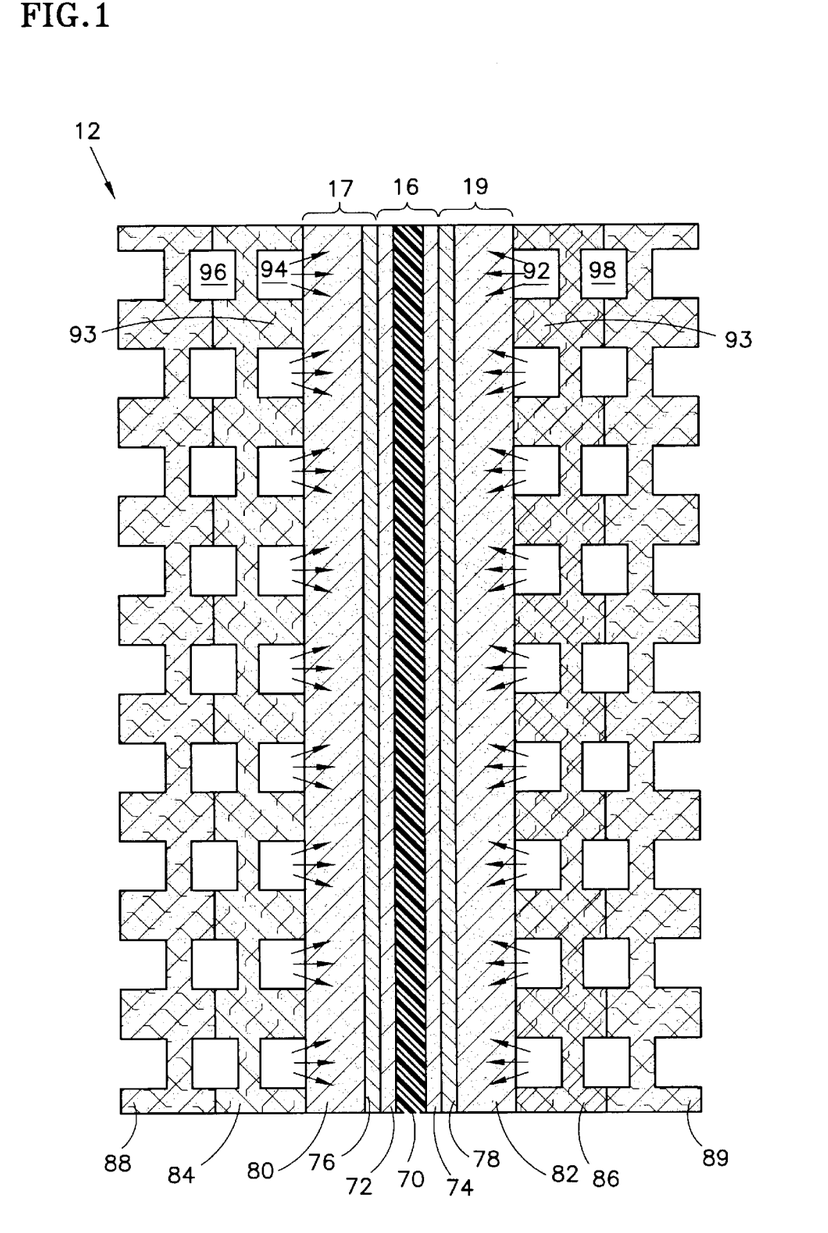
FIG. 1 is a simplified, sectioned side elevation of slightly more than one fuel cell which may be part of a stack with which the present invention may be practiced.

Referring to FIG. 1, there is shown a cross sectional view of a typical fuel cell 12, which includes a membrane electrode assembly (MEA) 16, an anode support plate 17 and a cathode support plate 19. The MEA 16 comprises a polymer electrolyte membrane ("PEM") 70, an anode catalyst 72 and a cathode catalyst 74. The anode catalyst 72 and the cathode catalyst 74 are secured on opposite sides of the PEM 70.

The anode support plate 17 and cathode support plate 19 may include hydrophobic diffusion layers 76, 78 and hydrophilic substrate layers 80, 82. The anode diffusion layer 76 is adjacent to a side of the anode catalyst 72, and the anode substrate layer 80 is adjacent to the anode diffusion layer 76 opposite the anode catalyst 72. The anode diffusion layer 76 and the hydrophilic anode substrate layer 80 allow the fuel reactant gas, which passes through a passageway 94 in a water transport plate 84, and the water, which passes through a passageway 96, to reach the anode catalyst 72. In the general case, the water passageways may be adjacent to the plate that provides the reactant gas passages. The fuel cell 12 also includes a hydrophobic cathode diffusion layer 78 and a hydrophilic cathode substrate layer 82, which allow the oxidant reactant gas passing through a passageway 92 in a water transport plate 86 to reach the cathode catalyst 74. The cathode diffusion layer 78 is adjacent to a side of the cathode catalyst 74, and the cathode substrate layer 82 is adjacent to the cathode diffusion layer 78 opposite the cathode catalyst 74. The hydrophobic cathode diffusion layer 78 and the hydrophilic cathode substrate layer 82 also allow the product water, which forms in the cathode catalyst 74, to migrate toward the water transport plate 86.

The diffusion layers 76, 78 are applied to both the anode and cathode substrate layers 80, 82, within the anode support plate 17 and cathode support plate 19, by procedures well known in the art. One procedure is described in U.S. Pat. No. 4,233,181. The diffusion layers 76, 78 are typically constructed of porous conductive layers that are rendered hydrophobic or partially hydrophobic by means of a hydrophobic polymer.

As shown in FIG. 1, the anode water transport plate 84 is adjacent to the anode support plate 17, and the cathode water transparent plate 86 is adjacent to the cathode support plate 19. The anode and cathode water transport plates 84, 86 may be structured and/or oriented to cooperate with adjacent water transport plates 88, 89 such that the passageways 96 and 98 simultaneously serve as the coolant stream for both the anode of one cell and cathode of the next cell.

The water transport plates 84, 86, 88, 89 are typically porous graphite having a mean pore size of approximately two (2) to three (3) microns and a porosity of about 35% to 40%. It is preferable to make the water transport plates 84, 86, 88, 89 hydrophilic by treating them with tin oxide ($SnO_2$) such as described in U.S. Pat. No. 5,840,414, which is owned by the assignee of the present invention and hereby incorporated by reference.

The hydrophilic porous nature of the cathode water transport plate 86, in conjunction with a negative pressure differential between the coolant and oxidant reactant gas streams, ensures proper removal of the product water formed at the cathode. Specifically, the water flows from the cathode support plate 19, through the water transport plate 86 and into the coolant passageways 98. Also, the anode water transport plate 84 furnishes the anode support plate 17 with a continuous supply of water, which eventually reaches the PEM and prevents it from becoming dry.

Figure 2:
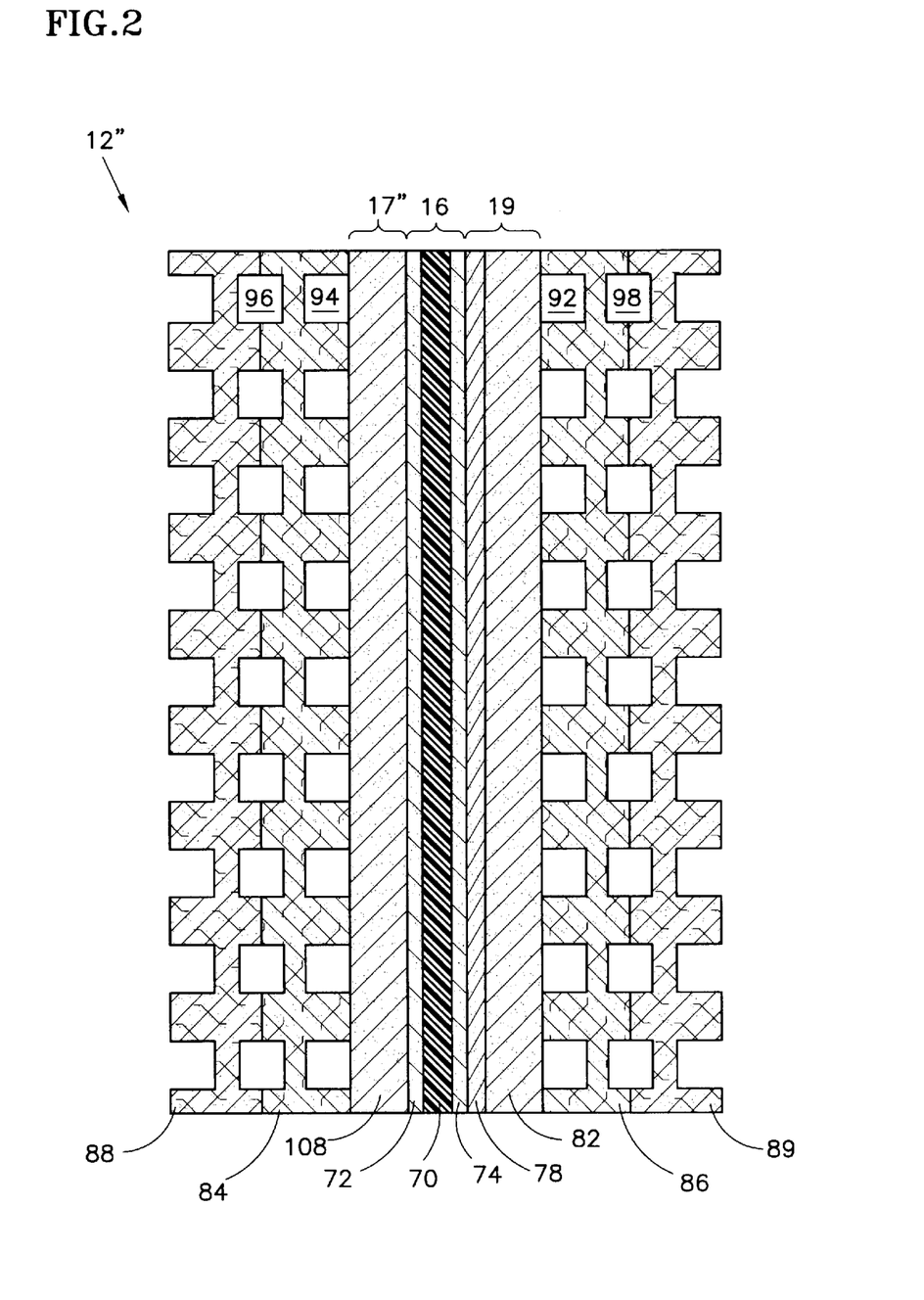
FIG. 2 is a simplified, sectioned side elevation of an alternative to that shown in FIG. 1.

Referring to FIG. 2, there is shown an alternative embodiment of a fuel cell 12". The fuel cell 12" in FIG. 2 differs from the fuel cell 12 in FIG. 1, in that the anode support plate 17" of FIG. 2 includes a hydrophilic substrate layer 108 but does not include a diffusion layer. Not using a diffusion layer on the anode support plate further increases the performance capability of the fuel cell by removing all hydrophobic or partially hydrophobic barriers to the transport of liquid water from the anode water transport plate 84 to the anode catalyst 72.

Figure 3:
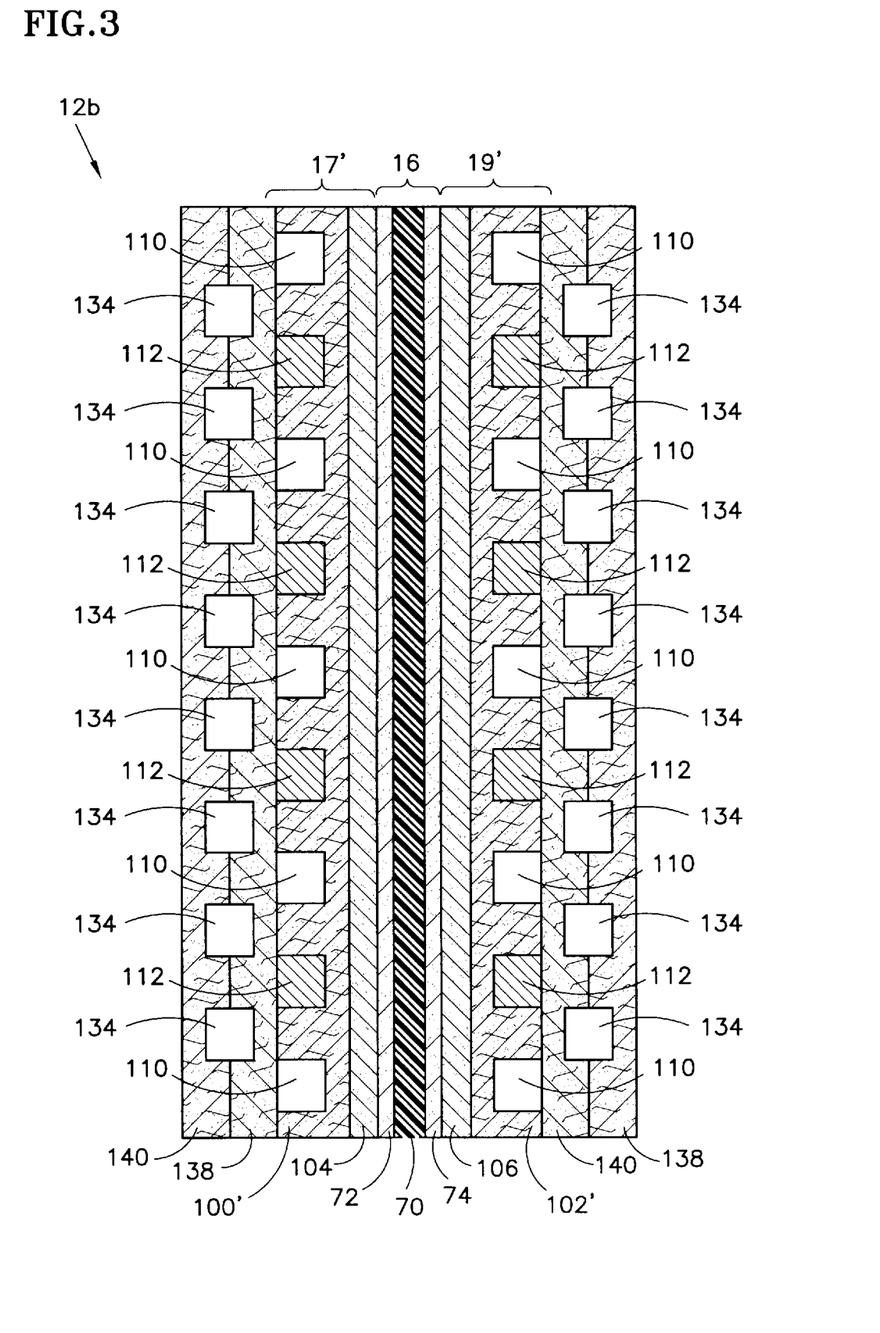
FIG. 3 is a simplified, sectioned side elevation of another alternative to that shown in FIG. 1.

Referring to FIG. 3, there is shown another alternative embodiment 12b of a fuel cell which may be used with the present invention and has interdigitated reactant passageways 110, 112 within the substrate layers 100', 102' rather then in the water transport plates 138, 140, thereby allowing the reactant gas streams to pass directly into and through the substrate layer in lieu of first entering channels in the water transport plates. Specifically, the substrate layers 100', 102' are oriented such that the passageways 110, 112 are adjacent to flat porous water transport plates 138, 140, respectively.

Because the interdigitated passageways 110, 112 are within the substrate layers 100', 102' rather then in the water transport plates 138, 140, the water transport plates 138, 140, are flat on the side adjacent the anode and cathode support layers 17', 19'. The opposite side of the water transport plates 138, 140, however, have coolant passageways 134. Additionally, the water transport plates 138, 140 are still porous and allow water to pass therethrough. Although not shown, it is possible for the orientation of the substrate layers 100', 102' to be reversed, such that the passageways 110, 112 are adjacent the diffusion layers 104, 106. Whether the reactant gas passageways have a conventional or serpentine flow-through configuration or interdigitated configuration, the water transport plates include additional grooves on their opposite side. When this opposite side abuts another water transport plate, or any other plate, these grooves serve as passageways for the coolant stream to pass therethrough. Additionally, when the anode and cathode water transport plates abut each other and these grooves align, these grooves jointly create a single coolant stream passageway that serves as water transport plates for both the anode of one cell and the cathode of an adjacent cell.

The fuel cell stack may have solid separator plates between fuel cells, which would appear between the anode water transport plates 84, 89 and the cathode water transport plates 86, 88. Or, each cell may be separated from an adjacent cell by solid separator plates having coolant channels therein, as shown in U.S. patent application Ser. No. 10/036,181, filed Dec. 28, 2001. The coolant channels would similarly be placed, at every fourth or so fuel cell, between an anode water transport plate, such as one of the plates 84, 89, and a cathode water transport plate, such as one of the transport plates 86, 88, of an adjacent fuel cell. In the case of coolant plates between adjacent cells or occasionally interspersed in the stack, the coolant therein may either be antifreeze solution, or it may be water. In the usual case, if separate coolant channels are utilized, antifreeze may typically be used so as to simplify the handling of coolant in climates which are below the freezing temperature of water.

There are additional configurations disclosed in U.S. patent application Ser. No. 09/733,133, filed Dec. 8, 2000, with which the invention may be used.

The invention may also be used with passive water management fuel cells, such as that disclosed in the aforementioned application Ser. No. 10/036,181, in which the ends of water channels adjacent to corresponding reactant gas inlet manifolds are dead ended, and the other ends of the water channels drain excess water into a related reactant gas exhaust manifold.

In addition, other types of fuel cells, not employing water transport plates of any sort, which rely on external humidification of the reactant gases prior to entry into the flow fields of the fuel cell stack, and which rely on carrying product water from the stack by means of the oxidant reactant gas flow, may also take advantage of aspects of the present invention. Examples of this type of fuel cell are U.S. Pat. No. 6,117,577 to Wilson, as well as U.S. Pat. Nos. 5,366,818 and 5,773,160, to Wilkinson et al.

Figure 4:
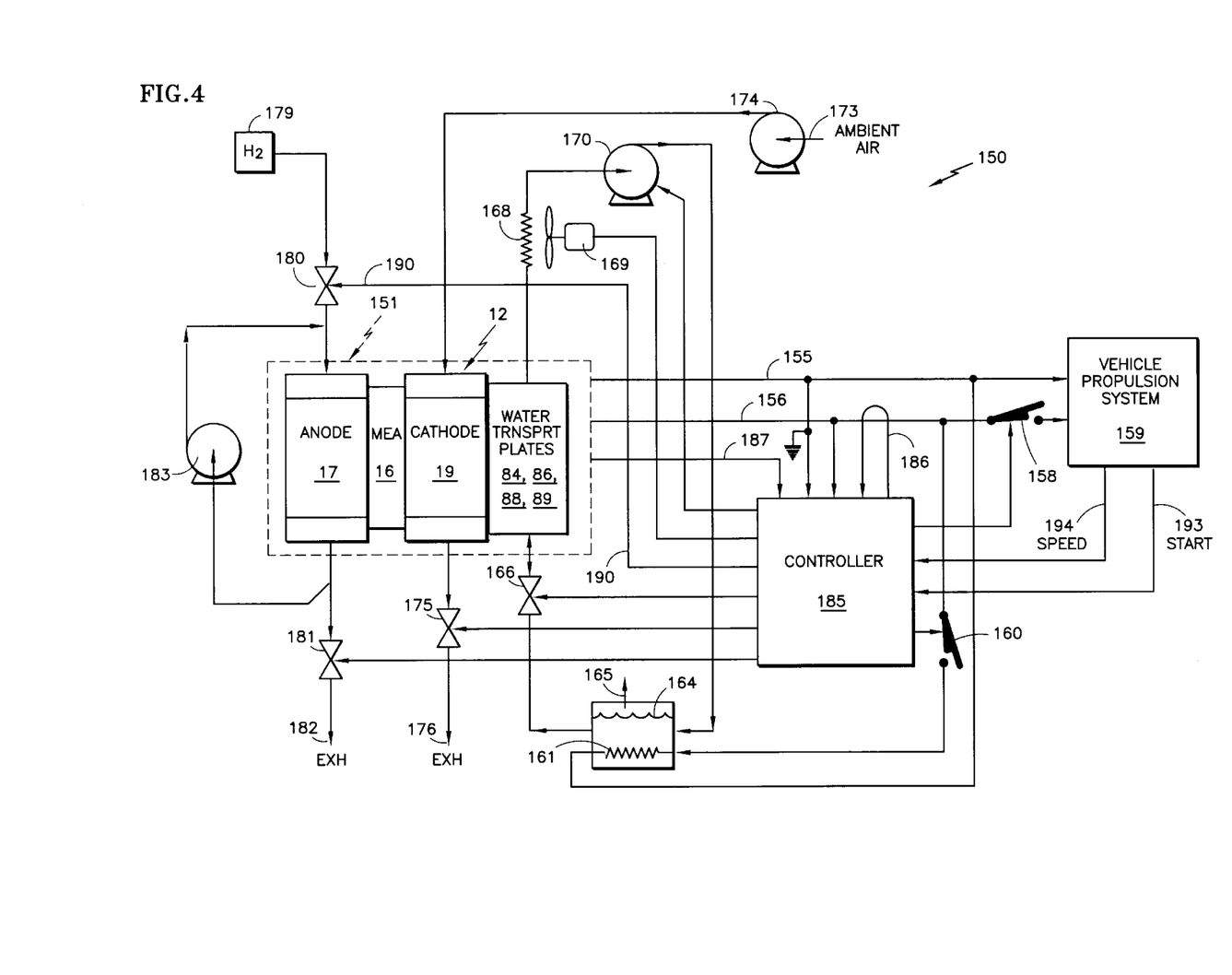
FIG. 4 is a schematic illustration of a vehicle engine propulsion system, including a fuel cell stack by which it is powered, which may practice the present invention.

Referring now to FIG. 4, a vehicle 150 includes a fuel cell stack 151 comprising a plurality of contiguous fuel cells, only one fuel cell 12 being shown in FIG. 4. The electrical output at the positive and negative terminals of the fuel cell stack 151 is connected by a pair of lines 155, 156 through a switch 158 to a vehicle propulsion system 159. The output is also connected through a switch 160 to an auxiliary heater 161 in a reservoir 164 of a water circulation system, the reservoir having a vent 165. The water circulation system may include a trim valve 166, water passages, such as those within water transport plates 84, 86, 88, 89, a radiator and fan 168, 169 which is selectively operable to cool water circulating in the system, and a water pump 170. Ambient air at an inlet 173 is provided by a pump, such as a blower 174, to the oxidant reactant gas flow fields of the cathode 19, and thence through a pressure regulating valve 175 to exhaust 176. Hydrogen is supplied from a source 179 through a flow regulating valve 180 to the fuel reactant gas flow fields of the anode 17, and thence through a pressure regulating valve 181 to exhaust 182. A fuel recycle loop includes a pump 183.

A controller 185 responds to load current determined by a current detector 186 as well as to the voltage across the lines 155, 156; it may also have temperature of the stack provided on a line 187. The controller, in turn, can control the valve 180 over a line 190 as well as controlling the other valves, the switches 158, 160 and the pumps 174, 170, as shown in FIG. 4.

The controller 185 responds to start and speed control signals from the vehicle propulsion system 159 on lines 193 and 194, which will indicate when the fuel cell should commence operation, and the amount of power being demanded by the vehicle propulsion system.

It is assumed that the vehicle propulsion system will be started up in a condition in which at least a portion of the fuel cell stack 151 is below the freezing temperature of water. When that is the case, the entire vehicle may be in an ambient environment which is below the freezing temperature of water. It is further assumed, for the explanation that follows, that the fuel cell stack has had substantially all of the water in the porous support plates and the reactant gas flow fields removed, which may be achieved in accordance with a procedure disclosed in U.S. Pat. No. 6,596,426. Thus, there will likely be ice in the PEM, in the anode and cathode catalyst layers, as well as within the pores of the water transport plates. However, it should be borne in mind that the water transport plates themselves can hold ice within the pores without doing damage to the water transport plates, as in the case for the PEM. Furthermore, the substrates 80, 82 (FIG. 1) are sufficiently close to the PEM itself (as seen in FIG. 1) that the temperature of the water that is transferred into the substrates will very nearly follow the temperature of the PEM, rather than the temperature of the reactant gases themselves. Thus, even though the water transport plates have ice in the pores thereof, product water will not freeze in the substrates due to the transient heat transfer characteristic of the cell; this is an important aspect of the present invention.

According to the invention, whenever a start signal is sent from the vehicle propulsion system 159 over the line 193 to the controller 185, signals from the controller will cause the valves 180, 181 and the pump 183 to be operated appropriately so as to provide fuel reactant gas to the flow fields of the anode 17, and the valve 175 and pump 174 will be operated appropriately to provide ambient air to the flow fields of the cathode 19. Initially, more than a stochiometric amount of hydrogen based on current density during startup will be provided to the anode 17. Similarly, at least twice the stochiometric amount of air is provided initially; preferably an amount up to about five times stochiometric requirement of air is initially provided. The more air that is provided, the more uniform will be the current distribution among the various cells of the stack 151.

When fuel and air of sufficient quantity have been provided uniformly to the cells, open circuit voltage will be detected on the lines 155, 156 by the controller 185. At that time, which is illustrated at point 197 in FIG. 5, the controller closes the switch 158 so as to connect the fuel cell stack 151 to the vehicle propulsion system 159. Optionally, the controller 185 may also close the switch 160 at the same time so as to connect the fuel cell stack to an auxiliary load, which may comprise the heater 161 in the reservoir 164, which will start to melt some of the ice in the reservoir 164. With the fuel cell stack providing power to the loads, heat produced by the reactions within the fuel cell stack causes the fuel cell stack materials and the ice to begin warm up, in the period denoted 198 in FIG. 5.

When the temperature of the stack reaches about 0° C. (32° F.) in the range of times indicated as 199 in FIG. 5, the heat generated by the stack is absorbed as the heat of fusion of the ice within the stack, substantially all of which is in the water transport plates. In fact, the water transport plates may have as much as 10 or 20 times more ice than the PEM, causing the temperature of the stack to remain at 0° C. out to nearly three minutes after startup, depending upon the power level. After about two and one-half minutes, at a point indicated as 202 in FIG. 5, heat generated by the operation of the stack is absorbed as sensible heat by the materials of the stack and the water inside the stack. Then, beginning at a point indicated as 203 in FIG. 5, evaporative cooling begins to occur.

Although the air and hydrogen that are being brought into the stack may be very cold, and even below the freezing temperature of water, as the gases pass through the flow fields, they rapidly warm up and after about three and one-half minutes (at point 203), will begin evaporating product water and water in the water transport plates into the gas streams, thereby providing cooling to the cell stack. During the entire initial time that the cell stack is operating, up to about seven and one-half minutes in FIG. 5, at the point identified as 204, the stack is relying on air cooling and primarily evaporative cooling to prevent excessive local heating at any point within the stack. At point 204, about seven and one-half minutes after initiating stack operation, there typically will be sufficient liquid water in the reservoir 164 to fill the water circulating system, from the tank through the valve 166, through the water transport plates, through the radiator 168, the pump 170 and back to the reservoir 164, can all be filled with water. Although there may not be sufficient water to replace all of the ice in the reservoir 164 at this time, that is not, however, necessary. Therefore, circulation of water flowing within the water circulation system, including the water passages in the cell stack, can begin at point 204. Thereafter, liquid cooling of the cell stack, as in normal cell stack operation, will take place.

According to the invention, it is important to note that the vehicle was placed in condition for operation within about 15 seconds of starting the flow of reactant gases into the stack; the stack was maintained in a sufficiently cool state by the heat of fusion of the melting ice in the water transport plates, by the heating up of the mass of the stack and water, and by the evaporation of water from the water transport plates into the reactant gases, particularly the oxidant reactant gas (air).

In one known type of PEM fuel cells, the coolant water is managed through porous water transport plates, and by recirculating the water through a restriction, the water is caused to be at between 7 and 21 kPa (1 to 3 psi) below the pressure of the reactants, which are typically at atmospheric pressure. This ensures that water will not pool in the reactant gas channels, that the water is forced into the water channels, and that the hydrophilic substrates will not be flooded and will have sufficient open porosity to permit reactant diffusion. However, when freezing temperatures are encountered, the water in the reactant channels, coolant channels, water pump and other conduits of the water circulatory system is drained upon shutdown of the fuel cell system; upon startup, there is no circulating water so there is no way to maintain negative pressure in the water channels. Therefore, coolant can build up in the reactant channels. According to another aspect of the invention, water buildup in the reactant flow fields prior to the operation of the water circulation system is avoided by pressurizing the reactant flow fields in the initial phases of startup.

In FIG. 4, pressurization of the oxidant can be achieved by the controller closing the valve 175 to restrict flow below that which occurs during normal operation, and pressurization of the fuel reactant gas can be achieved by the controller balancing the settings of the valves 180, 181 suitably so that the pressure of the fuel reactant gas will be above the pressure in the water channels by at least 4 kPa (0.6 psi) and preferably 4 to 21 kPa (0.6–3 psi). The pressure differentials are measured between the reactant exhaust manifolds and the water inlet manifold of the stack.

Figure 6:
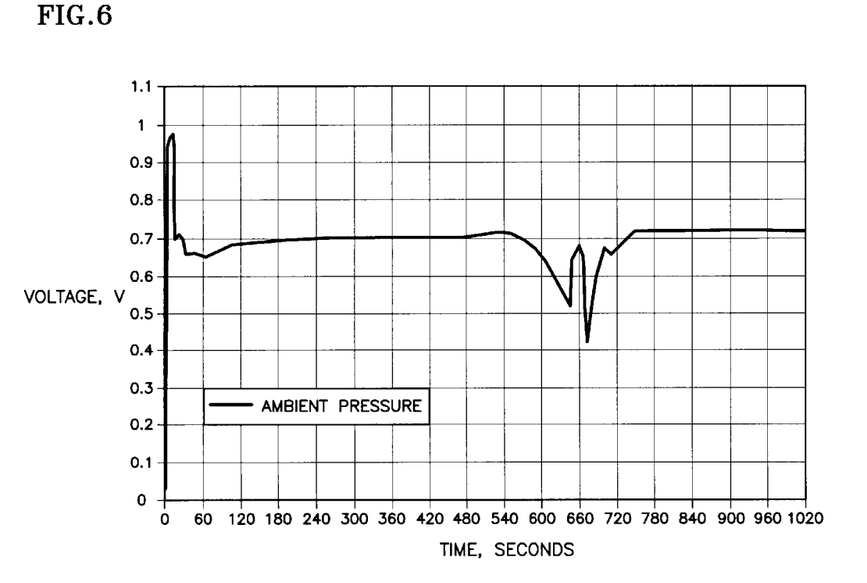
FIG. 6 is a plot of fuel cell stack voltage as a function of time during a startup from −20° C. with the pressure of the reactant gases equal to the pressure of the water in the water channels.
Figure 7:
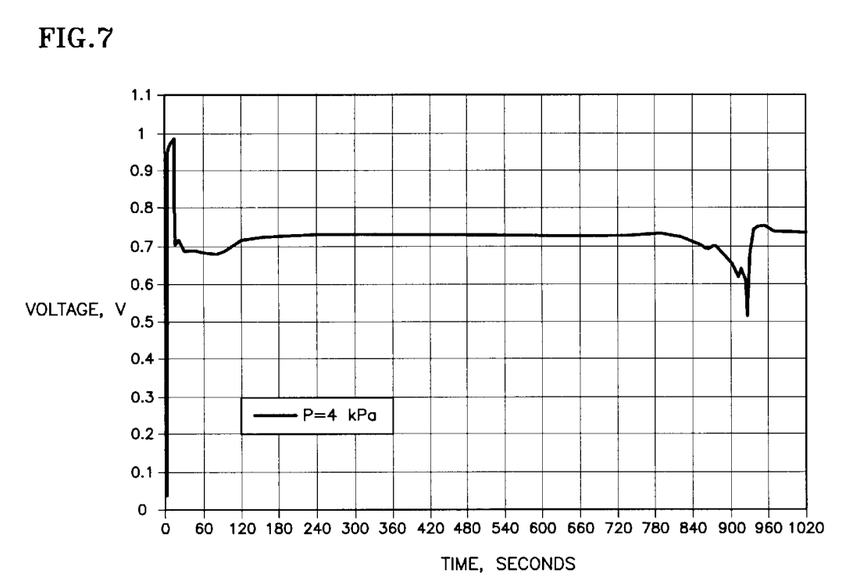
FIG. 7 is a plot of fuel cell stack voltage as a function of time during a startup from −20° C. with the pressure of the reactant gases pressurized relative to the pressure of the water in the water channels.

FIGS. 6 and 7 show voltage as a function of time following a startup at $-20°$ C. ($-4°$ F.) with a current density of 300 mA/cm$^2$. In FIG. 6, both reactant gases are at ambient pressure. And there is no pressure differential between the gases in the reactant channels and the water in the water channels. Referring to FIG. 6, the voltage per cell is relatively constant, after about 120 seconds (2 minutes) then rises slightly beginning at 480 seconds (8 minutes) and begins to decline and have a negative slope versus time at about 540 seconds (9 minutes). The decline in voltage at 540 seconds (9 minutes) is indicative of the time when, because of flooding, the air cannot reach the cathode catalyst, and so the performance is reduced. This indicates that with no pressure differential between reactants and water, this particular cell of a fuel cell stack operated perfectly well for about 9 minutes.

In FIG. 7, after approximately two minutes, the voltage is substantially constant until about 800 seconds (13 minutes and 20 seconds) as a result of the reactant gases operating at a pressure of 4 kPa (0.6 psi) above the pressure of the water in the water channels. Thus, according to the invention, by operating the fuel cells with the reactant gas pressure sufficient to assist water in passing through the porous plates adjacent to the support plates, the time that the fuel cell can operate without reduced performance with no active water management and no circulating coolant water, is extended from 9 minutes to 13 minutes and 20 seconds, which is a four minute and 20 seconds improvement, an improvement of about 32%. The invention may be utilized when a water transport plate is adjacent to only one of the support plates; the invention may be utilized with reactant to water pressure differentials higher than and slightly lower than 4 kPa (0.6 psi); and the invention may be used in fuel cells powering electric vehicles or other loads, which fuel cells have a variety of different configurations.

After a few minutes of initiating operation, when the controller 185 senses a reduction in voltage across the fuel cell output lines 155, 156 it will turn on the pump 170 and adjust the valve 166 to have a sufficient restriction to operate the coolant water at a pressure of 4–21 kPa (0.6–3 psi) below the reactants.

The various aspects of the present invention may be used to advantage, where appropriate, singly or in combination with less than all of the aspects of the invention, and may be used to power loads which are selected from a propulsion system of an electric vehicle or other electric loads.

Figure 5:
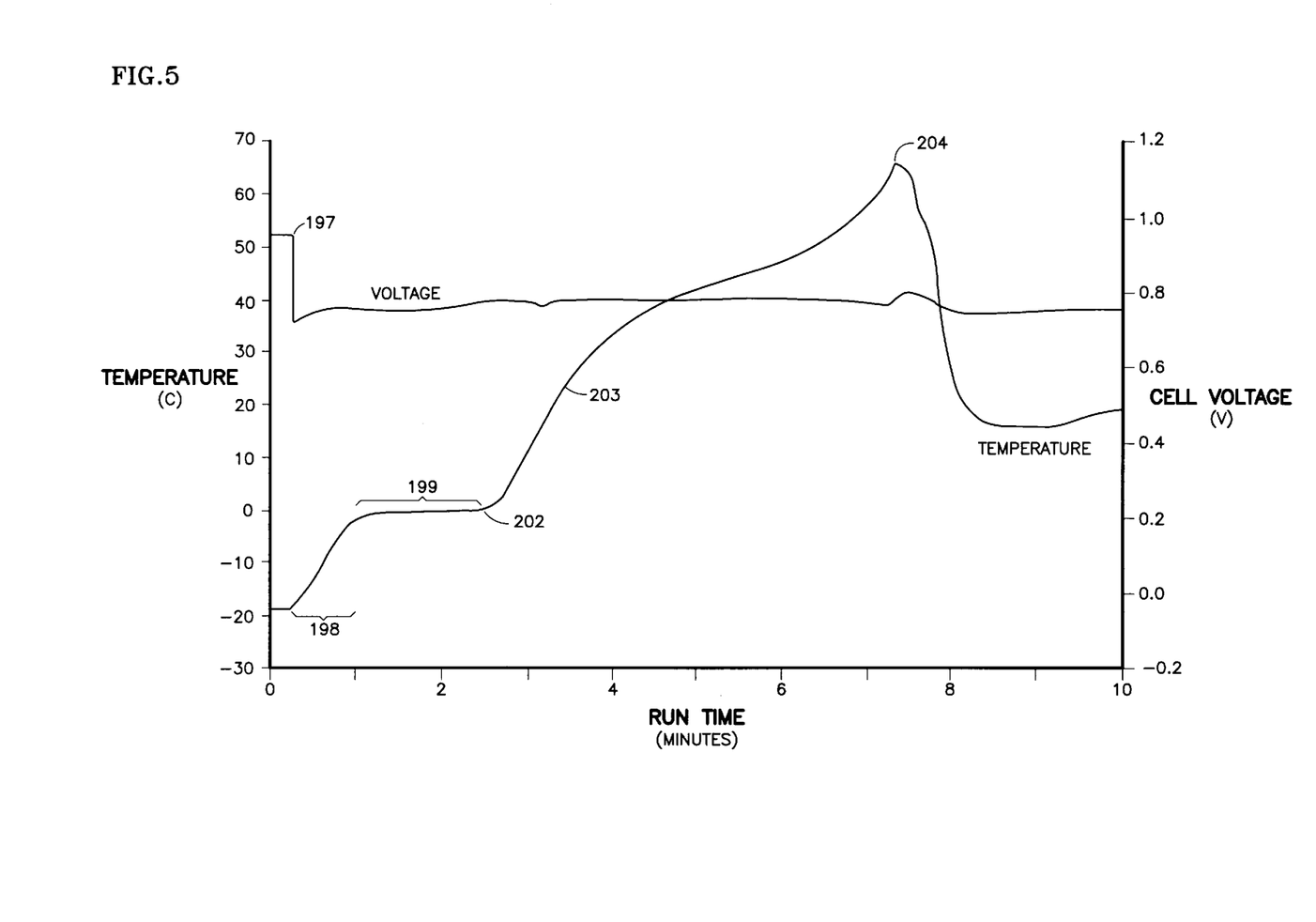
FIG. 5 is a plot of fuel cell stack voltage and temperature as a function of time, during a startup of a vehicle from −20° C.

There is a difference between the voltage characteristic in FIG. 6, in which the voltage begins a negative slope at about 9 minutes, and the voltage depicted in FIG. 5 which begins to have a negative slope at about just over 7 minutes. This is due to the fact that the load on the cell when the data of FIG. 5 were obtained was higher than when the data of FIG. 6 were obtained.

In a typical situation, the auxiliary load 161 may be selected to draw between about 20% and about 40% of rated power of the stack. "Rated power" is the maximum average power output of a device. If desired, auxiliary loads not within the reservoir 164 may be utilized, such as on or in conduits, within the stack itself, or otherwise. However, it is useful to utilize all of the generated power in a manner that enhances the ability to start the vehicle (or other ultimate load) within seconds of reactant gas flow, and drive it without endangering the fuel cell by overheating, until such time as coolant circulation may begin.

Although the example herein is illustrated with fuel cells having water transport plates adjacent both the anode the cathode, the invention may be practiced with water transport plates adjacent only one of the electrodes. In the example herein, both of the support plates are at least partially hydrophilic, and possibly totally hydrophilic. On the other hand, the invention can also be practiced where the support plates are partially or totally hydrophobic in order to enhance gas flow therethrough. One aspect of the invention is being able to start the vehicle almost immediately upon introduction of reactant gases while being able to utilize reactant gases which may be below the freezing temperature of water. However, the invention may also be practiced while utilizing reactant gases above the freezing temperature of water, even though at least some part of the stack may be below the freezing temperature of water.

The invention has a principal value in serving electric vehicles powered by PEM fuel cell stack assemblies; however, it obviously can be used with loads other than vehicle propulsion systems.

All of the aforementioned patents and patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of initiating operation of an electric load powered by a power plant including a proton exchange membrane fuel cell stack at least part of which is at a temperature below the freezing temperature of water, said stack having a plurality of cells and having water passages connected to a water circulation system to provide at least one of (i) product water removal (ii) condensate removal (iii) humidification of reactants, and (iv) cooling, each of said cells including a membrane electrode assembly disposed between an anode support plate and a cathode support plate, a fuel reactant gas flow field on an anode side of said cell, and an oxidant reactant gas flow field on a cathode side of said cell, said method comprising:

(a) monitoring the current provided by and voltage across said stack;

(b) with said stack disconnected from said load, providing at least stoichiometric requirement of fuel reactant gas to said fuel flow fields and at least stochiometric requirement of air from said ambient environment to said oxidant flow fields;

(c) upon occurrence of a condition selected from (v) within less than about 20 seconds from step (b) and (vi) when open circuit voltage across said stack is detected, connecting said stack to power said load; and (d) upon the expiration of approximately five minutes following step (c), starting circulation of water flowing within said water passages.

2. A method of initiating operation of an electric load powered by a power plant including a proton exchange membrane (PEM) fuel cell stack at least part of which is at a temperature below the freezing temperature of water, said stack having a plurality of cells and having water passages connected to a water circulation system, with a reservoir, to provide at least one of (i) product water removal (ii) condensate removal (iii) humidification of reactants, and (iv) cooling, each of said cells including a membrane electrode assembly disposed between an anode support plate and a cathode support plate, a fuel reactant gas flow field on an anode side of said cell, and an oxidant reactant gas flow field on a cathode side of said cell, said method comprising:

(a) monitoring the current provided by and voltage across said stack;

(b) with said stack disconnected from said propulsion system, providing at least stoichiometric requirement of fuel reactant gas to said fuel flow fields and at least stochiometric requirement of air from said ambient environment to said oxidant flow fields;

(c) upon occurrence of a condition selected from (v) within less than about 20 seconds from step (b) and (vi) when open circuit voltage across said stack is detected, connecting said stack to power said load; and (d) upon the occurrence of a condition selected from (vii) the expiration of approximately five minutes following step (c), or (viii) when the quantity of liquid water within said water circulation system is sufficient to fill all of said water circulation system except said reservoir, starting circulation of water flowing within said water passages.

3. A method according to claim 1 or 2 wherein:
said load is a propulsion system of a vehicle; and
said step (c) comprises connecting said stack to power said propulsion system.

4. A method of initiating operation of an electric vehicle in an ambient environment having a temperature below the freezing temperature of water, said vehicle having a propulsion system powered by a power plant including a proton exchange membrane fuel cell stack at least part of which is at a temperature below the freezing temperature of water, said stack having a plurality of cells each including a membrane electrode assembly disposed between an anode support plate and a cathode support plate, said support plates being porous and at least partially hydrophilic, a fuel reactant gas flow field on an anode side of said cell, and an oxidant reactant gas flow field on a cathode side of said cell, each cell having at least one of (i) a porous water transport plate disposed adjacent said anode support plate and (ii) a porous water transport plate disposed adjacent said cathode support plate, each water transport plate having water passages connected to a water circulation system, with a reservoir, to provide at least one of (iii) product water removal (iv) condensate removal (v) humidification of reactants, and (vi) cooling, said method comprising:

(a) previously causing the pores of said support plates to be substantially free of water;

(b) monitoring the current provided by and voltage across said stack;

(c) with said stack disconnected from said propulsion system, providing unheated, unhumidified fuel reactant gas to said fuel flow fields in excess of stochiometric requirement and unheated, unhumidified oxidant reactant gas from said ambient environment to said oxidant flow fields in excess of about two times stochiometric requirement;

(d) upon occurrence of a condition selected from (vii) within less than about 20 seconds from step (c) and (viii) when open circuit voltage across said stack is detected, connecting said stack to power said propulsion system;

(e) upon the occurrence of a condition selected from (ix) the expiration of about five minutes following step (d), and (x) when liquid water within said water circulation system is sufficient to fill said water circulation system except said reservoir, starting circulation of water flowing within said water passages and providing fuel reactant gas to said fuel flow fields of at least stochiometric requirement and oxidant reactant gas from said ambient environment to said oxidant flow fields of less than about twice stochiometric requirement, cooling of said stack between step (d) and step (e) being provided by heating the ice in said water transport plates, the heat of fusion of melting ice, heating the mass of said stack, and by evaporation of water, at least from said water transport plates, into said oxidant reactant gas.

5. A method of initiating operation of an electric vehicle having a propulsion system powered by a power plant including a proton exchange membrane fuel cell stack at least part of which is at a temperature below the freezing temperature of water, said stack having a plurality of cells and having water passages connected to a water circulation system, with a reservoir, to provide at least one of (i) product water removal (ii) condensate removal (iii) humidification of reactants, and (iv) cooling, each of said cells including a membrane electrode assembly disposed between a porous anode support plate and a porous cathode support plate, the pores of said support plates being substantially free of water, a fuel reactant gas flow field on an anode side of said cell, and an oxidant reactant gas flow field on a cathode side of said cell, said method comprising:

(a) monitoring the current provided by and voltage across said stack;

(b) with said stack disconnected from said propulsion system, providing fuel reactant gas to said fuel flow fields in excess of stochiometric requirement and oxidant reactant gas to said oxidant flow fields in excess of about two times stochiometric requirement;

(c) upon occurrence of a condition selected from (v) within less than about 20 seconds from step (b) and (vi) when open circuit voltage across said stack is detected, connecting said stack to power said propulsion system; and (d) upon the occurrence of a condition selected from (vii) the expiration of five minutes following step (c), or (viii) when the quantity of liquid water within said water circulation system is sufficient to fill said water circulation system except said reservoir, starting circulation of water flowing within said water passages and providing fuel reactant gas to said fuel flow fields of at least stochiometric requirement and oxidant reactant gas to said oxidant flow fields of less than about twice stochiometric requirement.

6. A method of initiating operation of an electric vehicle in an ambient environment having a temperature below the freezing temperature of water, said vehicle having a propulsion system powered by a power plant including a proton exchange membrane fuel cell stack at least part of which is at a temperature below the freezing temperature of water, said stack having a plurality of cells and having water passages connected to a water circulation system, with a reservoir, to provide at least one of (i) product water removal (ii) condensate removal (iii) humidification of reactants, and (iv) cooling, each of said cells including a membrane electrode assembly disposed between an anode support plate and a cathode support plate, a fuel reactant gas flow field on an anode side of said cell, and an oxidant reactant gas flow field on a cathode side of said cell, said method comprising:

(a) monitoring the current provided by and voltage across said stack;

(b) with said stack disconnected from said propulsion system, providing at least stochiometric requirement of unheated, unhumidified fuel reactant gas to said fuel flow fields and at least stochiometric requirement of unheated, unhumidified air from said ambient environment to said oxidant flow fields;

(c) upon occurrence of a condition selected from (v) within less than about 20 seconds from step (b) and (vi) when open circuit voltage across said stack is detected, connecting said stack to power said propulsion system; and (d) upon the occurrence of a condition selected from (vii) the expiration of five minutes following step (c), or (viii) when the quantity of liquid water within said water circulation system is sufficient to fill all of said water circulation system except said reservoir, starting circulation of water flowing within said water passages and providing fuel reactant gas to said fuel flow fields of at least stochiometric requirement, and providing air from said ambient environment to said oxidant flow fields of less than about twice stochiometric requirement.

7. A method of initiating operation of an electric vehicle having a propulsion system powered by a power plant including a proton exchange membrane fuel cell stack at least a part of which is at a temperature below the freezing temperature of water, said stack having a plurality of cells and having water passages connected to a water circulation system, with a reservoir, to provide at least one of (i) product water removal (ii) condensate removal (iii) humidification of reactants, and (iv) cooling, each of said cells including a membrane electrode assembly disposed between an anode support plate and a cathode support plate, a fuel reactant gas flow field on an anode side of said cell, and an oxidant reactant gas flow field on a cathode side of said cell, said support plates being porous and at least partially hydrophilic, said method comprising:

(a) previously causing the pores of said support plates to be substantially free of water;

(b) monitoring the current provided by and voltage across said stack;

(c) with said stack disconnected from said propulsion system, providing fuel and oxidant reactant gas respectively to said fuel flow fields and to said oxidant flow fields;

(d) upon occurrence of a condition selected from (v) within less than about 20 seconds from step (c) and (vi) when open circuit voltage across said stack is detected, connecting said stack to power said propulsion system;

(e) upon the occurrence of a condition selected from (vii) the expiration of five minutes following step (d), or (viii) when liquid water within said water circulation system is sufficient to fill said water circulation system except said reservoir, starting circulation of water flowing within said water passages and providing fuel reactant gas to said fuel flow fields of at least stochiometric requirement and oxidant reactant gas to said oxidant flow fields of less than about twice stochiometric requirement.

8. A method of initiating operation of an electric vehicle having a propulsion system powered by a power plant including a proton exchange membrane fuel cell stack at least part of which is at a temperature below the freezing temperature of water, said stack having a plurality of cells each including a membrane electrode assembly disposed between a porous anode support plate and a porous cathode support plate, the pores of said support plates being substantially free of water, a fuel reactant gas flow field on an anode side of said cell, and an oxidant reactant gas flow field on a cathode side of said cell, each cell having at least one of (i) a porous water transport plate disposed adjacent said anode support plate and (ii) a porous water transport plate disposed adjacent said cathode support plate, each water transport plate having water passages connected to a water circulation system, with a reservoir, to provide at least one of (iii) product water removal (iv) condensate removal (v) humidification of reactants, and (vi) cooling, said method comprising:

(a) monitoring the current provided by and voltage across said stack;

(b) with said stack disconnected from said propulsion system, providing fuel and oxidant reactant gas respectively to said fuel flow fields and to said oxidant flow fields;

(c) upon occurrence of a condition selected from (vii) within less than about 20 seconds from step (b) and (viii) when open circuit voltage across said stack is detected, connecting said stack to power said propulsion system;

(d) upon the occurrence of a condition selected from (ix) the expiration of five minutes following step (c), or (x) when liquid water within said water circulation system is sufficient to fill said water circulation system except said reservoir, starting circulation of water flowing within said water passages and providing fuel reactant gas to said fuel flow fields of at least stochiometric requirement and oxidant reactant gas to said oxidant flow fields of less than about twice stochiometric requirement, cooling of said stack between step (c) and step (d) being provided by heating the ice in said water transport plates, the heat of fusion of melting ice, heating the mass of the stack, and by evaporation of water, at least from said water transport plates, into said oxidant reactant gas.

9. A method according to any of claims 1, 2 and 4–8 wherein the power plant comprises an auxiliary load, and:
said connecting step further comprises connecting said auxiliary load to said stack.

10. A method according to claim 9 wherein said auxiliary load is selected to draw between about 20% and about 40% of rated power of said fuel cell stack.

11. A method according to any of claims 1, 2 and 5–7 wherein:
said water passages comprise passages in or adjacent to at least one porous water transport plate, each cell having at least one of a water transport plate adjacent said anode support plate and a water transport plate adjacent said cathode support plate.

12. A method according to any of claims 1, 2, 5, 6 and 8 wherein:
said support plates are at least partially hydrophilic.

13. A method according to any of claims 1, 2 and 4–8 wherein:
said support plates are at least partially hydrophobic.

14. A method according to any of claims 1, 2, 5, 7 and 8 wherein:
said step of providing reactant gases comprises providing reactant gases, at least one of which is at the temperature of an outside ambient environment of said fuel cell stack.

15. A method according to any of claims 1, 2 and 4–8 wherein, in said step of providing, at least two times stochiometric requirement of oxidant reactant gas is provided.

16. A method according to any of claims 1, 2 and 4–8 wherein, in said step of providing, at least three times stochiometric requirement of oxidant reactant gas is provided.

17. A method according to any of claims 1, 2 and 4–8 wherein, in said step of providing, at least four times stochiometric requirement of oxidant reactant gas is provided.

18. A method according to any of claims 1, 2 and 4–8 wherein, in said step of providing, at least five times stochiometric requirement of oxidant reactant gas is provided.

19. A method according to any of claims 1, 2 and 4–8 wherein, in said step of providing, at least one of said reactant gases is provided at a pressure of at least 4 kPa (0.6 psi) above either (i) pressure of any water in said water passages, or (ii) atmospheric pressure.

20. A method according to any of claims 1, 2 and 4–8 wherein, in said step of providing, at least one of said reactant gases is provided at about atmospheric pressure.

21. A method of initiating operation of an electric load powered by a proton exchange membrane (PEM) fuel cell stack at least part of which is at a temperature below the freezing temperature of water, said stack having a plurality of cells and having water passages connected to a water circulation system to provide at least one of (i) product water removal (ii) condensate removal (iii) humidification of reactants, and (iv) cooling, each of said cells including a MEA disposed between an anode support plate and a cathode support plate, a fuel reactant gas flow field on an anode side of said cell, and an oxidant reactant gas flow field on a cathode side of said cell, said method comprising:

(a) monitoring the current provided by and voltage across said stack;

(b) with said stack disconnected from said load, providing at least stochiometric requirement of fuel reactant gas to said fuel flow fields and at least stochiometric requirement of oxidant reactant gas to said oxidant flow fields, at least one of said reactant gases being at a pressure at least 4 kPa (0.6 psi) above either (v) atmospheric pressure or (vi) pressure of any water in said water passages;

(c) after said step (b), connecting said stack to power said load; and (d) after said step (c), starting circulation of water flowing within said water passages.

22. A method of initiating operation of an electric load powered by a proton exchange membrane (PEM) fuel cell stack at least part of which is at a temperature below the freezing temperature of water, said stack having a plurality of cells and having water passages connected to a water circulation system, to provide at least one of (i) product water removal (ii) condensate removal (iii) humidification of reactants, and (iv) cooling, each of said cells including a MEA disposed between an anode support plate and a cathode support plate, a fuel reactant gas flow field on an anode side of said cell, and an oxidant reactant gas flow field on a cathode side of said cell, said method comprising:

(a) monitoring the current provided by and voltage across said stack;

(b) with said stack disconnected from said load, providing at least stochiometric requirement of fuel reactant gas to said fuel flow fields and at least stochiometric requirement of oxidant reactant gas to said oxidant flow fields, at least one of said reactant gases being at a pressure at least 4 kPa (0.6 psi) above either (v) atmospheric pressure or (vi) pressure of any water in said water passages;

(c) upon occurrence of a condition selected from (vi) within less than about 20 seconds from step (b) and (vii) when open circuit voltage across said stack is detected, connecting said stack to power said load; and (d) upon the expiration of about five minutes following step (c), starting circulation of water flowing within said water passages.

23. A method of initiating operation of an electric load powered by a proton exchange membrane (PEM) fuel cell stack at least part of which is at a temperature below the freezing temperature of water, said stack having a plurality of cells and having water passages connected to a water circulation system with a reservoir, to provide at least one of (i) product water removal (ii) condensate removal (iii) humidification of reactants, and (iv) cooling, each of said cells including a MEA disposed between an anode support plate and a cathode support plate, a fuel reactant gas flow field on an anode side of said cell, and an oxidant reactant gas flow field on a cathode side of said cell, said method comprising:

(a) monitoring the current provided by and voltage across said stack;

(b) with said stack disconnected from said load, providing at least stochiometric requirement of fuel reactant gas to said fuel flow fields and at least stochiometric requirement of oxidant reactant gas to said oxidant flow fields, at least one of said reactant gases being at a pressure at least 4 kPa (0.6 psi) above either (v) atmospheric pressure or (vi) pressure of any water in said water passages;

(c) upon occurrence of a condition selected from (vi) within less than about 20 seconds from step (b) and (vii) when open circuit voltage across said stack is detected, connecting said stack to power said load; and (d) upon the occurrence of a condition selected from (vii) the expiration of five minutes following step (c), or (viii) when the quantity of liquid water within said water circulation system is sufficient to fill all of said water circulation system except said reservoir, starting circulation of water flowing within said water passages.

* * * * *